United States Patent [19]

Tespa

[11] Patent Number: 4,590,962
[45] Date of Patent: May 27, 1986

[54] GAS FUSE

[76] Inventor: Brian Tespa, 699 Wade Avenue W., Penticton, B.C. V2A 1V6, Canada

[21] Appl. No.: 617,687

[22] Filed: Jun. 6, 1984

Related U.S. Application Data

[63] Continuation-in-part of Ser. No. 407,828, Aug. 13, 1982, abandoned.

[30] Foreign Application Priority Data

Jul. 7, 1983 [CA] Canada .................................. 406833

[51] Int. Cl.⁴ ............................................. F16K 31/12
[52] U.S. Cl. .................................... 137/498; 137/460; 137/462; 137/512.3; 137/539; 137/550; 137/557
[58] Field of Search ............... 137/460, 462, 496, 498, 137/512.3, 516.25, 517, 539, 550

[56] References Cited

U.S. PATENT DOCUMENTS

| | | | |
|---|---|---|---|
| 1,305,964 | 6/1919 | Dickson | 137/557 X |
| 2,121,936 | 6/1938 | Thomas | 137/496 X |
| 2,138,719 | 11/1938 | Wright | 137/498 |
| 2,633,147 | 3/1953 | Badami | 137/516.25 X |
| 2,668,555 | 2/1954 | Bartolat | 137/498 |
| 2,744,537 | 5/1956 | Clark | 137/462 |
| 2,770,252 | 11/1956 | Bass | 137/550 X |
| 2,821,209 | 1/1958 | Waterman | 137/498 |
| 2,833,117 | 5/1958 | Wilcocks | 137/460 X |
| 2,896,663 | 7/1959 | Mena | 137/550 X |
| 2,906,286 | 9/1959 | Hanscom | 137/460 |
| 3,561,471 | 2/1971 | Sands | 137/460 X |
| 3,645,286 | 2/1972 | Follett | 137/460 X |
| 3,725,990 | 4/1973 | Peterson | 137/539 X |
| 4,010,770 | 3/1977 | Peters | 137/462 X |
| 4,240,652 | 12/1980 | Wong | 285/91 |
| 4,319,604 | 3/1982 | Bird | 137/460 X |

FOREIGN PATENT DOCUMENTS 839349  6/1960  United Kingdom ................ 137/460

Primary Examiner—Harold W. Weakley
Attorney, Agent, or Firm—Barrigar & Oyen

[57] ABSTRACT

A gas safety valve is provided which has a valve chamber within a housing, and a gas inlet and outlet respectively communicating with an inlet and outlet end of the valve chamber. Valve means are disposed in the valve chamber for allowing gas to flow from the inlet to the outlet when the valve means is in an open position, and preventing gas flow when the valve means is in a closed position at either end of the valve chamber. The valve means may comprise a piston having a tortuous gas transmitting opening therein, the resistance to gas flow caused by the tortuous opening rendering the valve means responsive to slight variations in gas pressure differential between the inlet and the outlet. Resilient means are provided which extend between the outlet and the valve means. The resilient means urge the valve means into the open position, and allow it to reversibly move to a closed position against the outlet when the pressure differential between the inlet and outlet of the valve chamber becomes sufficiently high to overcome the resistance of the resilient means.

9 Claims, 9 Drawing Figures

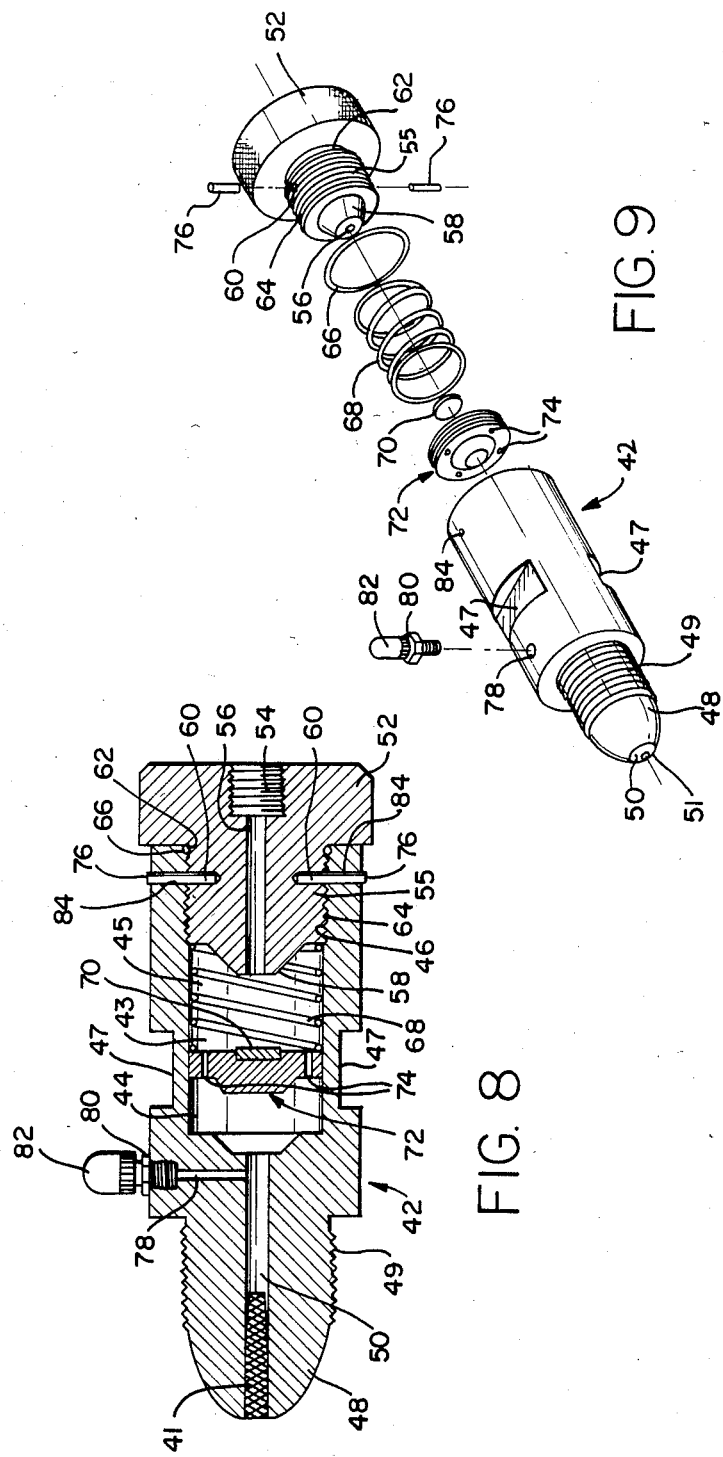

GAS FUSE

FIELD OF THE INVENTION

This application is a continuation-in-part of my application Ser. No. 407,828, filed Aug. 13, 1982, now abandoned.

This invention relates to an apparatus which is useful in significantly increasing the safety of gas lines and gas equipment. More particularly, this invention relates to a two-way safety valve which prevents the accidental escape of gas when a high pressure gas line leaks or is ruptured. The safety valve offers three safety features. It provides complete shut-off of high pressure gaseous fuel from the tank to the regulator, complete shut-off of low pressure fuel from the regulator to the appliance, and complete shut-off of upstream flow of gaseous fuel into an empty bottle, thereby eliminating a potentially dangerous situation.

DESCRIPTION OF THE PRIOR ART

Relatively low pressure inflammable gas is utilized for a great number of applications. For example, metal bottles containing propane are often used to provide fuel for torches, gas barbecues, stoves and gas appliances such as might be found in a typical recreation vehicle. In many areas of the continent, natural gas is piped under pressure from a gas utility to homes for use in cooking, heating and the like. Typically, such gas pressures will run in the vicinity of between about 60 psig and 300 psig. In utilizing gas received through a pressure gas line from a gas source, it is typically passed through a pressure regulator before being transmitted to the point of consumption.

It is a relatively common occurrence for gas lines between the regulator and the point of consumption to become ruptured, or for the valves or lines in such a position to leak. Such rupture may result from accidental blows to the line or valves, or simply from improper installation. Leakage can also result from a faulty pressure regulator. Any unwanted or undetected leakage can result in an uncontrolled flow of inflammable gas thereby producing a hazardous situation. This is particularly true if the gas leak or flow is proximate to the point of consumption. There is usually a pilot light or flame at the consumption point and leaked or undetected stray gas can cause dangerous uncontrolled fires or explosions.

Many devices have been designed and disclosed in the past for minimizing the danger which may result from accidental leakage of inflammable gas. The applicant is aware of a number of references which have some relevance to the applicant's apparatus.

| U.S. Pat. No. | Issue Date | Inventor |
|---|---|---|
| 2,085,628 | June, 1937 | Brannan |
| 2,229,893 | January, 1941 | Hubka |
| 2,245,271 | | Guill |
| 2,744,537 | May, 1956 | Clark |
| 2,906,286 | September, 1959 | Hanscom |
| 2,958,375 | November, 1960 | Feibush |
| 3,434,493 | March, 1969 | Owens |
| 3,561,471 | February, 1971 | Sandy |
| 4,010,770 | March, 1977 | Peters |

U.S. Pat. No. 2,245,271, Guill, discloses a safety cut-off valve which utilizes a piston slidably mounted in a valve chamber of a housing, and which moves against a spring to close gas flow through the valve upon loss of pressure between the valve and the point of consumption. The device described is intended for high-pressure applications such as associated with oxygen or acetylene tanks. The Guill device is relatively complex in construction (requiring grooves in the inside of the cylinder and a lateral and axial passage through the piston) and hence is susceptible to malformation. Guill also makes no provision for simply and readily resetting the valve to the open position. To reset, the inlet end of the valve must be cracked from the high-pressure tank. The necessity of such a procedure to reset the valve, in itself, can create a dangerous situation. For example, if an operator neglects to close the main valve on the tank prior to cracking the safety cut-off valve, high-pressure gas may escape therefrom resulting in a hazardous situation, particularly if there is an open flame nearby. In addition, high-pressure gas might still escape from the tank in the event that the main valve thereon does not close properly. Guill's device also does not accommodate the situation where the operator fails to stop the leakage, whereupon it may be necessary to undo the valve from the high-pressure tank and reapply it one or more times until the leakage is stopped.

U.S. Pat. No. 2,906,286, Hanscom, discloses a safety valve for use in the hydraulic brake fluid field. Hanscom discloses a safety valve which includes a valve element which carries a gasket cap, which in closed position, seals the outlet opening. The valve element, which is in the form of a piston, is provided with a restricted flow passage which communicates between the inlet and the outlet. While the Hanscom device may be suitable for use in association with hydraulic brakes, his device has some shortcomings in relation to pressurized inflammable gas. For example, a broad gasket of the type used in Hanscom does not provide secure sealability in a natural gas related application. Gas at high pressures will leak through a very small opening much more readily than will hydraulic oil. Devices and constructions disclosed in the hydraulic fluid field cannot be adopted wholesale for use in the pressurized inflammable gas field. The sealing gasket in Hanscom would not in the configuration disclosed be reliable in sealing propane or natural gas attempting to flow out through the outlet. Under high gas pressure, the rubber gasket would tend to squirm and leak.

U.S. Pat. No. 3,561,471, A. D. Sands, discloses a safety valve for use in the gas distribution field. Sands discloses a "bobbin" shaped valve member with a conduit therein which is centrally disposed. Consequently, the conduit is not sealed off when the valve is in a closed position.

U.S. Pat. No. 4,010,770, Peters, discloses a velocity flow control valve for use in natural gas field applications. Peters utilizes a ball for purposes of sealing the outlet of the valve. Since the ball does not fit snugly within the valve housing, it is susceptible to fluttering, or offset seating, when a sudden burst of pressure is exerted against the ball.

SUMMARY OF THE INVENTION

Because of the potential hazards associated with the use of high pressure inflammable gas, and the demand of the public that such gas must be completely safe to use, there has been a longstanding need to have a gas safety valve which is relatively simple to construct and reliable in operation, which provides complete cut-off of a gas flow in either direction upon loss of pressure at either the inlet or outlet, and which can be reset without detaching the gas fuse from a gas bottle, or other source of gas.

I have invented a gas safety valve which comprises a housing having a valve chamber which has therein a gas inlet and a gas outlet which communicate respectively with an inlet and outlet end of the valve chamber. Valve means are disposed in the housing for allowing a gas flow from the inlet to the outlet when the valve means is in an open position. The valve means prevents gas flow when in the closed position involving either the inlet or the outlet. The valve means is disposed in the valve chamber and is movable therein in response to a pressure differential in either direction between the inlet and the outlet of the valve chamber. The gas safety valve includes resilient means extending between the housing and valve member for urging the valve member into the open position. The resilient means allows the valve means to reversibly move to the closed position when the pressure differential between the inlet and outlet ends of the valve chamber become sufficiently high to overcome the resilient means.

The gas safety valve may include a release valve disposed in a bleed passage from the inlet to the exterior of the housing, so as to release gas from the inlet end of the valve chamber when the valve means is in an inlet closed position. Preferably, the valve means comprises a piston slidably mounted in the valve chamber. The release valve may be a manually operable check valve.

The invention is directed to a safety valve for use in a pressurized gas line comprising (a) a housing having a valve chamber, a gas inlet communicating with an inlet at one location in the valve chamber, and a gas outlet communicating with an outlet at another location in the valve chamber; (b) valve means disposed in the valve chamber for allowing gas to flow from the inlet to the outlet when the valve means is disposed intermediate the inlet and outlet and preventing gas flow from the inlet to the outlet when the valve means abuts the outlet, and preventing reverse gas flow from the outlet to the inlet when the valve means abuts the inlet, said valve means having therethrough a gas conduit which causes gas passing through the conduit to change direction sharply before exiting the valve means; and (c) resilient means extending between the outlet of the valve chamber and the outlet side of the valve means for urging said valve means into an intermediate open position in the valve chamber, but allowing the valve means to reversibly move to a closed position against the outlet when the pressure differential between the inlet and outlet of the valve chamber becomes sufficiently high to overcome the resistance of the resilient means, the resilient means also permitting the valve means to abut the inlet when a reverse differential in pressure exists in the valve chamber.

In the safety valve, the valve chamber may be of a hollow cylindrical configuration and the valve means may be a piston having a first end facing the inlet of the valve chamber and an opposite end facing the outlet of the valve chamber, the piston fitting snugly against the walls of the valve chamber and being free to move from an inlet closed position wherein the inlet facing end of the piston blocks the inlet to an outlet closed position wherein the outlet facing end of the piston blocks the outlet, the piston having between hollowed the inlet facing end and the outlet facing end a hollowed-out portion which forms part of the gas conduit passing through the piston. The hollowed-out portion may extend around the circumference of the piston and the conduit may pass through the portion of the piston on the inlet side of the hollowed-out area, then through the hollowed-out portion, and then through the portion of the piston on the outlet side of the hollowed-out area.

DRAWINGS

Specific embodiments of the invention will now be described in detail with reference to the drawings in which:

FIG. 8 represents a side elevation section view of an alternative embodiment of the gas safety valve; and FIG. 9 represents a perspective exploded view of the alternative embodiment of the gas safety valve.

DETAILED DESCRIPTION OF PARTICULAR EMBODIMENTS OF THE INVENTION

Figure 2:
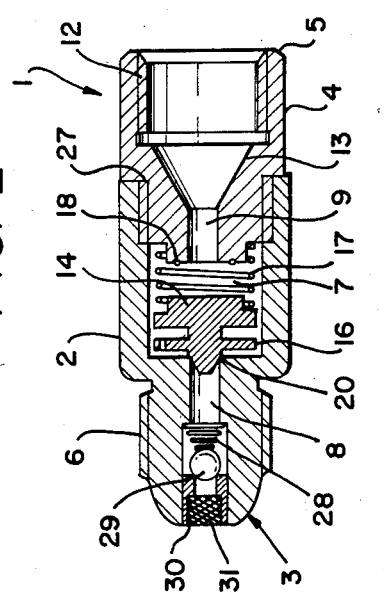
FIG. 2 represents a side elevation view of the gas safety valve taken along Section A—A of FIG. 1.
Figure 1:
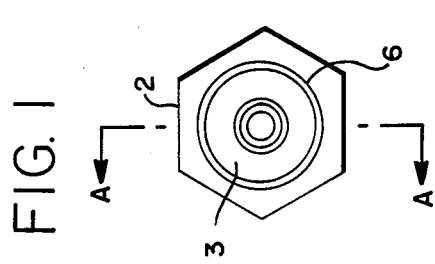
FIG. 1 represents a front elevation view of the gas safety valve.

The gas safety valve 1, as seen in section in FIG. 2, is formed of two main components comprising a housing 2 with an inlet end 3, and a fitting 4 with an outlet end 5. The housing 2 has a generally elongated hexagonal shape except for the inlet end 3 which is circular with male threads 6 around the exterior thereof. The housing 2 and the fitting 4 in combination form a valve chamber 7, the valve chamber 7 also having an inlet end 8 and an outlet end 9.

Figure 3:
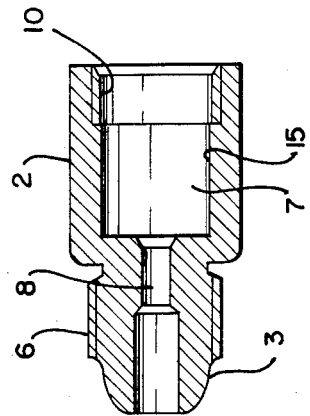
FIG. 3 represents a side elevation view of the housing of the gas safety valve taken along Section A—A of FIG. 1.

The construction of the housing 2 is shown in more detail in FIG. 3. A portion of the inside surface of the valve chamber 7 at the outlet end 9 is provided with standard female threads 10. The exterior inlet end 3 is provided with standard male threads 6 which are adapted to be received gas-tight in the mating female threads of a standard gas connection such as that used on a commercial propane or butane tank or cylinder. The inlet 8 extends axially through the inlet end 3 of the housing 2 and connects the exterior of the inlet end 3 with the valve chamber 7.

Figure 4:
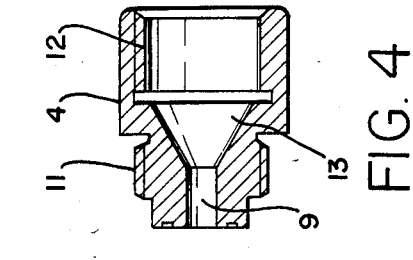
FIG. 4 represents a side elevation view of the outlet fitting of the gas safety valve taken along Section A—A of FIG. 1.

The outlet end of housing 2 by being provided with female threads 10, is adapted to receive the corresponding male threads 11 of hexagonally shaped fitting 4, as shown in detail in FIG. 4. Fitting 4 has a female threaded surface 12 which is adapted to receive a standard gas line fitting such as is used on a regulator or a propane stove or the like. The female threads 12 correspond in pitch with male threads 6 of housing 2. The outlet end 9 has a frustoconical portion 13 extending from the outlet end 9 into the area enclosed by threads 12. The opposite end of outlet 9 communicates with the outlet end of valve chamber 7. An O-ring 27 fitting in a recess in fitting 4 ensures that a tight gas seal is obtained between fitting 4 and housing 2.

Figure 5:
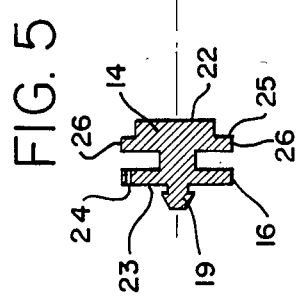
FIG. 5 represents a side elevation view of the valve means of the gas safety valve taken along Section A—A of FIG. 1.

As can be seen in FIG. 2, and in detail in FIG. 5, a two-way piston or dash pot 14 fits within valve chamber 7. The side walls 15 of chamber 7 are cylindrical. Likewise, the lateral exterior surface 16 of dash pot 14 is cylindrical so that dash pot 14 fits snugly within cylindrical walls 15 and can slide backwardly and forwardly left-to-right and vice versa as seen in FIG. 2) a short distance inside valve chamber 7.

The dash pot 14, being slidably disposed within valve chamber 7, will slide therein in response to a pressure differential between the inlet end 8 and outlet end 9 of the valve chamber 7. The dash pot 14 can slide between an inlet closed position as shown in FIG. 2, in which the dash pot 14 is abutted against inlet 8, and an outlet closed position wherein dash pot 14 abuts the opening to outlet 9. In the inlet closed position (as seen in FIG. 2) which occurs when there is a back pressure between inlet 8 and outlet 9, no gas can flow out through the inlet 8. An O-ring 20 provides a gas tight seal between dash pot 14 and inlet 8. In the outlet closed position in which the dash pot 14 abuts the outlet 9, no gas can flow from the valve chamber 7 through outlet 9. An O-ring 18 provides a gas tight seal between dash pot 14 and outlet 9.

A compression coil spring 17 is disposed in the valve chamber 7 and abuts the outlet end 9 of the fitting 4 at one end and abuts the dash pot 14 at the opposite end. The spring 17 is a compression coil spring type so as to urge the dash pot 14 into an open position approximately mid-way between inlet end 8 and outlet end 9. In this position, gas can flow from inlet 8 through to outlet 9. However, the compression strength of the spring 17 is carefully selected so as to allow the dash pot 14 to reversibly move to the outlet closed position thereby blocking outlet 9 when the pressure differential between inlet end 8 and outlet end 9 of the valve chamber 7 becomes sufficiently high. The expression "sufficiently high" is to be interpreted as meaning that the pressure differential between inlet 8 and outlet 9 becomes sufficiently great so as to cause the dash pot 14 to move in a direction toward the outlet 9 and compress the spring 17 until the dash pot 14 reaches the outlet closed position. The compression strength of the spring 17 can be varied according to the capacity of the gas safety valve that is required for any given situation, for example, home use, industrial use, or camper use.

As can be seen in FIG. 2, the gas safety valve 1 has the capacity to prevent gas flow in either direction. Gas flow from the inlet 8 to the outlet 9, as described above, is prevented when dash pot 14 overcomes the resistance of spring 17 and abuts outlet 9. Gas sealing capacity is enhanced by O-ring 18 which rests in a groove around the circumference of outlet end 9. O-ring 18 may be of the type available on the market under the trade mark Viton O-ring 011.

Gas flow in the opposite direction, that is, from outlet end 9 to inlet end 8, is prevented when dash pot 14 moves to the inlet closed position as depicted in FIG. 2. Dash pot 14 is constructed so that it has a nose 19 which extends into the inlet 8. An O-ring 20 forms a collar around nose 19 and ensures that a tight gas seal is achieved. O-ring 20 can be of the type sold in commerce under the trade mark Viton O-ring 007.

Figure 6:
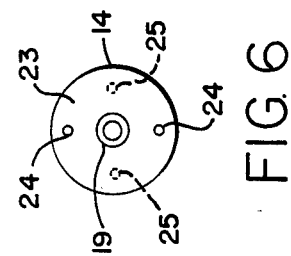
FIG. 6 represents a front elevation view of the valve means.

The construction of dash pot 14 is illustrated in detail in FIG. 5, which represents a side section view, and FIG. 6, which represents a front elevation view of dash pot 14. Viewed from the side, dash pot 14 is constructed to have roughly an "H" shape. The mass of dash pot 14 can be varied to satisfy various capacity and pressure response requirements for the safety valve 1. For small applications, the mass of dash pot 14 would be reduced by increasing the width of recess 21, or machining away material from downstream end 22. For higher capacity applications requiring a heavier dash pot 14, recess 21 would be relatively narrow, and more mass might be present in downstream end 22. The dash pot 14 illustrated in FIG. 5 would be typical for the ordinary home gas consumption environment wherein gas pressures would be in the order of 250 psig, and gas flows would be in the order of 80,000 BTU's per hour.

The circumference of the dash pot 14 fits snugly against the cylindrical wall of the valve chamber 7 and is generally gas-tight. Thus, the dash pot 14 is constructed so that it has small openings therethrough, which permit gas to pass through the dash pot 14 when the dash pot 14 is in an "open" position mid-way between inlet 8 and outlet 9. The forward disc 23 (or left leg of the "H" as seen from the side in FIG. 5) has machined therethrough a small opening 24. If need be, two openings 24 can be machined in the forward disc 23. The diameter of the opening 24 is carefully selected to suit the gas consumption requirement for the particular application in which the gas safety valve 1 is being installed. The flow of gas through opening 24 must balance the compression strength of spring 17, so that when the gas safety valve 1 is in the "open" position, that is, mid-way between inlet 8 and outlet 9, there is a balance. A sudden upset of the balance of pressure, from either side, will then either move the dash pot 14 to an outlet closed position abutting outlet 9, or an upstream closed position as shown in FIG. 2, wherein the dash pot 14 abuts inlet 8. The safety valve 1 is therefore capable of stopping the flow of gas when there is a drop in gas pressure in either the upstream or downstream side of the safety valve.

As illustrated in FIG. 6, two small openings 24 are machined in the primary wall 23. One or more similar openings 25 are machined in secondary wall 26. Rear openings 25 are of the same diameter as forward openings 24. However, in order to increase the sensitivity of the dash pot 14 to changes in pressure differential, it has been found advantageous to offset the positions of openings 24 in the forward disc 23, and the rear openings 25 in rear disc 26. While the applicant does not wish to be bound to any theories, it is thought that by having the gas first flow through opening 24, and then "twist" in order to flow through rear opening 25, a slight torque force is imparted on the dash pot 14, which causes the dash pot 14 to be more sensitive to gas pressure changes. This torque action occurs regardless of the direction in which the gas is flowing through the safety valve 1. This gives high sensitivity on the low pressure portion of the system existing from the regulator to the appliance. Complete shut-off is provided even in instances where the remaining pressure in the bottle is only 9 or 10 ounces.

Figure 7:
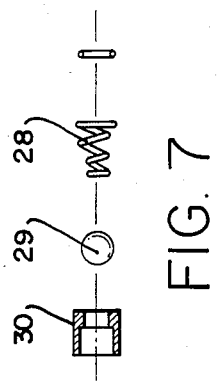
FIG. 7 represents an exploded side elevation section view of the buzzer spring-ball valve.

Located within inlet 3 of housing 2 is a novel buzzer spring-ball combination, which "buzzes", "chatters", or "gurgles" when the gas system in which the safety valve 1 is installed is being brought up to equilibrium pressure. This occurs when the main valve of the propane tank, or the main-service gas supply is being opened. The purpose of the buzzer-ball valve is to enable the user to confirm that gas is flowing through the gas safety valve 1 and that it is operating properly. Also, with the "buzzing" sound, a blind person can hear that the gas safety valve 1 is operating. The buzzer spring-ball combination, as illustrated in FIG. 7, consists of a buzzer spring 28, a ball 29, and seat 30. The spring 28 is of a conical-compression coil spring design. The ball 29 rests on the apex of the spring 28, and in a rest position, when no gas is flowing through gas fuse 8, rests against seat 30. However, when gas pressure builds up and passes through seat 30, it moves ball 29 away from seat 30. Because of the conical design of buzzer spring 28, ball 29 wobbles or vibrates, thereby generating the buzzing or vibrating sound.

Seat 30 is machined in a tubular shape, with one internal portion being of slightly larger diameter in order to receive a filter 31. Typically, the filter 31 can be of stainless steel mesh with a 140 micron gauge. The purpose of the filter 31 is to catch or retain any solid matter which may be present in the upstream gas line and thereby prevent such matter from entering the gas safety valve 1, and disturbing or upsetting the delicate balance within the valve chamber 7.

An alternative embodiment of the gas safety valve 1 is shown in FIGS. 8 and 9. This embodiment has a housing 42 with an inlet end 48, and outlet end 52, the housing 42 being generally cylindrical in shape except for the portion 47, which is indented so that it can be firmly gripped by a wrench. The housing 42 has a valve chamber 43, the valve chamber 43 having an inlet end 44 and outlet end 45. A portion 46 of the surface of the valve chamber 43 is provided with female threads. The inlet end 48 is provided with a standard male thread 49 which is adapted to be recieved in a standard mating female thread of a connection such as that on a propane or butane cylinder. An inlet 50 extends through the inlet end 48 and communicates with the inlet end 44 of the valve chamber 43. A stainless steel or charcoal filter 41 is optionally provided at the end of the inlet 50 remote from the valve chamber 43.

The outlet end of the housing 52 is provided with a cylindrical shaped portion 55 with a male threaded surface 64 adapted to screw tightly in female threaded surface 46. The outlet end 52 has a frustoconical protruding portion 58 extending from the cylindrical portion 55 into the valve chamber 43. An outlet from the valve chamber 43 is provided by means of passage 56 which extends through the outlet end 52 of the housing 42. Passage 56 terminates at one end in an enlarged female threaded portion 54. Portion 55 of the outlet end 52 is provided with two locking split pin receptacles 60 extending in a radial direction therein, and an O-ring seat 62 for an O-ring 66. Two locking split pins 76 each extend through a corresponding opening 84 in the housing 42 and a corresponding receptacle 60.

The housing 42 is provided with a bleed passage 78 which has disposed in it at its other end, a release valve 80 in the form of a manually operable check valve, such as the type commonly used for a vehicle tire valve. A cap 82 screws onto male threads (not shown) on the outside of the release valve 80.

The piston 72 depicted in FIGS. 8 and 9 has four openings 74, each of which extends in an axial direction through the piston 72. A seat 70 is centrally disposed in the downstream side of the piston 72. The piston 72 is slidably disposed in the valve chamber 43, and will slide in it in response to a pressure differential between the inlet end 44 and outlet end 45 of the valve chamber 43. The piston 72 can slide between an open position as shown in FIG. 8, in which the piston 72 is separated from the inlet 56 and the outlet 50, and in which gas can flow through the openings 74, and a closed position in which the piston 72 blocks the outlet 56 by means of seat 70 which is made of resilient material. In the downstream closed position, the piston 72 blocks the outlet 56 so that gas cannot flow from the valve chamber 43 through the outlet 56.

A spring 68 is disposed in the valve chamber 43 and abuts the cylindrical portion 55 of the outlet end 52 of the housing 42, and also abuts the piston 72. The spring 68 is a compression coil spring type so as to the piston 72 into the open position as shown in urge FIG. 8. However, the spring 68 will allow the piston 72 to reversibly move to the closed position blocking the outlet 56 when the pressure differential between the inlet end 44 and outlet end 45 of the valve chamber 43, becomes sufficiently high.

The piston 72 together with the openings 74 therethrough, also block any flow of gas from the outlet 56 to the inlet 50 when there is a reverse flow of gas in the gas fuse, such as may occur if there is a break in the line on the upstream end of the gas fuse. The inlet side of piston 72 fits snugly against the passage between inlet 50 and chamber 44, thereby preventing a reverse flow of gas.

It will be recognized that one or more features of the first described detailed embodiment illustrated in FIGS. 1 through 6, can be combined with one or more features of the second described detailed embodiment illustratd in FIGS. 7 and 8 to provide a gas safety valve which provides the advantages and characteristics of each feature. All main components of the gas safety valve described are made from noncorrosive metals such as brass and stainless steel. This provides virtually indefinite life. The inside surface of the valve chamber 7 has a fine finish which enables the dash pot 14 to smoothly slide therein without undue friction. The O-rings sealing all connection points may be made from a suitable elastic material such as Neoprene (trade mark) or the like.

To use the gas safety valve 1, and referring to the embodiment described in FIGS. 1 to 5, the inlet suitable end 3 is screwed into the female standard coupling of a source of pressurized gas, typically gas with a pressure in the vicinity of 60 psi to 300 psi. The female threaded portion 11 is then connected by means of suitable approved gas coupling to a standard pressure regulator which in turn is connected to the point of consumption of the gas. Consumption is usually in the form of an open flame. Under normal operation, gas will be free to flow from the source of pressurized gas, progressively through the inlet 3, the inlet end 8 of the valve chamber 7, openings 24 and 26 in the dash pot 14, the outlet end 9 of the valve chamber 7, and finally out of outlet end 5 to the pressure regulator. However, if pressure at the outlet 5 drops beyond a level which corresponds to the compression force on spring 17, such as would occur upon rupture in any lines receiving gas from the outlet 5, a pressure imbalance develops because the rate of gas flow through the openings 24 and 25 is fixed and the pressure at the inlet end 3 of the valve chamber 7 remains virtually constant. This imbalance results in a sufficient pressure differential on the upstream side of the dash pot 14 which thereby causes the dash pot 14 to overcome the force of spring 17 and move the dash pot 14 against outlet 9. Thus, outlet 9 is closed and gas is unable to flow from the valve chamber 7 into outlet 9. This action blocks the flow of gas in the gas line.

In order to reset the gas safety valve 1 so that the dash pot 14 returns to the open position, once the reason for the drop in downstream pressure has been rectified, an operator simply closes the main valve at the gas source, and "cracks" the valve 1 by unscrewing fitting 4 one-quarter turn from housing 2. This allows a small amount of gas on the upstream side to escape, thereby restoring the balance in the safety valve 1. In the case where the inlet 3 is provided with a release valve 80, the operator unscrews the cap 82, and presses the release valve 80 with a pointed object such as a pen tip. Either of these actions allows the gas to be released from the inlet end 3 of the chamber 7 thereby equalizing the pressure in the safety valve 1 and enabling dash pot 14 to be returned to the open position by spring 17. The main valve of the gas source can then be reopened. The buzzer spring 28 operates and signals that the system is again being pressurized. The buzzing stops when the system is again up to pressure.

If the operator has forgotten to correct the leakage problem, or has not corrected it properly, a very small amount of gas will again escape through the outlet 5, before the dash pot 14 will again move rapidly into the closed position. Thus, with the safety valve 1 in place, at no time can a significant amount of gas pass from the outlet 5 unless the pressure in the gas safety valve 1 is reasonably balanced so that the dash pot 14 remains in the open position. Disastrous consequences are thus avoided even if the leakage problem has not been corrected and there is an open flame. The preceding process can be conveniently and quickly repeated until the leak has been properly repaired.

Protection is provided in other ways. If the leakage problem has been corrected but the operator inadvertently neglects to turn off the main valve at the source of the pressurized gas, or such valve does not properly close, opening the fitting 4 one-quarter turn to relieve upstream pressure and return the dash pot 14 to the open position will not succeed. The dash pot 14 will not return to the open position because the net pressure in the inlet end 3 will be positive and either the dash pot 14 will remain in the downstream closed position, or the gas will hiss as it escapes the "cracked" fitting 4. If a bleed passage 78 is present, the operator will detect a leak by means of a continued hissing through bleed passage 78 and release valve 80. As only small amounts of gas will escape through the release valve 80 in such a situation, a potentially hazardous situation is avoided. If the valve at the source has been properly closed, the dash pot 14 will of course move back to the open position when the fitting 4 is "cracked" one-quarter turn or the release valve 80 is opened. When the leak has been properly repaired, the dash pot 14 will remain in the open position and the accepted amount of gas will flow through the gas safety valve 1.

The gas safety valve 1 also provides protection against drops in pressure on the upstream side of the gas safety valve, or pressure "blow-back" from the downstream end of the gas line. For example, if there is an explosion at the source of gas consumption, a positive pressure from the downstream end will be created which then causes dash pot 14 to move quickly to the upstream closed position against inlet 8 and O-ring 20. Thus, any danger of a flame being blown back through the safety valve 1 and into the propane tank is avoided. Many unfortunate accidents and deaths have occurred where the contents of a propane tank have ignited, or a rupture between the tank and the consumption point has occurred, thereby permitting dangerous gas to escape. A particularly hazardous situation involves propane tanks at the rear of a recreation vehicle becoming ruptured due to collision or roll over, or the valve of a propane tank for a gas fired barbecue grill is inadvertently opened by a child.

Various modifications to the gas fuse as described are possible. For example the dash pot 14 could be substantially solid, and instead of holes in the dash pot 14, channels could be provided on the inside surface of the valve chamber 7. Another possible alternative is replacement of the holes in the dash pot with a separate conduit, for example, through the housing 2. This conduit would have a first end communicating with the inlet end 3 of the valve chamber 7, and a second end connected to the outlet end 5 of the valve chamber 7. As discussed, the release valve 80 is optional. Its function is replaced by opening the fitting 4 one-quarter of a turn to permit inlet gas to escape. It is often handy to utilize the release valve 80 since in such a case, a wrench is not required to "crack" the fitting 4 to relieve pressure.

During manufacture, springs of various tension could be used in otherwise identical safety valves 1 to act as spring 17. The higher the tension of the spring used, the lower the pressure at the outlet 9 must be for a given pressure at the inlet 8, before the dash pot 14 will move to the closed position. The gas safety valve can also be utilized for liquids, and it is to be understood that "gas", as used in this application, can include a liquid.

Performance Demonstration

A demonstration with a prototype of the gas safety valve has been conducted. The inlet end of the gas safety valve was installed in the standard outlet of a propane tank valve. The outlet end of the safety valve was connected to a standard reinforced rubber gas hose which led to a manifold. A gas pressure gauge was fitted above the manifold. The downstream end of the manifold was connected to a gas regulator. The outlet of the regulator led to an adjustable opening gas valve, which was connected to a flame nozzle. The adjustable gas valve was constructed to pass, when fully open, a larger volume of gas than would be used in normal domestic consumption. The coil spring used to balance the position of the dash pot in the valve chamber was of 7 oz. compression strength, which is suitable in applications where 65,000 to 80,000 BTU of gas is drawn per hour.

With the adjustable gas valve closed, the valve on the propane tank was opened. Gas from the tank passed through the safety valve and into the manifold and the regulator. This action continued until the gas gauge read 80 psig. While the system was being pressurized, the safety valve buzzed or chattered indicating the passage of gas through the safety valve.

Once the buzzing or chattering of the safety valve had stopped, and the gas gauge had stabilized at 80 psig, the adjustable flow gas valve was opened and a flame was ignited at the nozzle. So long as the adjustable gas valve was partially opened, as would be the situation in normal domestic operation, the gas flame at the nozzle burned steadily, and gas continued to flow uninterrupted through the system. However, when the valve was fully opened suddenly, that is, to a point which permitted gas to flow through the system at a rate substantially higher than in normal domestic consumption (thereby simulating a break in the downstream line), the flame immediately became extinguished. Since the only device in the system capable of movement was the safety valve, the extinguishing of the flame indicated that the gas fuse had immediately responded to the excessive flow of gas and had stopped flow of gas. The adjustable gas valve was then moved to a closed position, and a small amount of residue gas that existed between the safety valve and the propane tank was released by turning the fitting on the safety valve one-quarter turn relative to the housing of the safety valve.

Once the system had been purged of residual gas, the fitting was tightened into the safety valve housing, and the valve from the propane tank was again opened to again pressurize the system to 80 psig. The pressurization process was confirmed by the buzzing or chattering of the safety valve. Then, the safety valve was disconnected from the outlet of the valve on the propane tank, thereby simulating a break upstream of the safety valve. The gas was heard to escape for a partial second before the safety valve shut off the attempted reverse flow of gas. The pressure on the gas gauge remained at 80 psig confirming that very little gas had escaped. These two demonstrations indicated that the safety valve not only closes the system when a rush of gas is experienced in the system in a downstream direction, but it closes the system when there is a rush of gas upstream.

In a third demonstration, the safety valve was again connected to the valve outlet of the propane tank, and the adjustable gas valve was fully opened. The attempted relief of pressure of gas within the manifold caused the safety valve to close in a downstream position. The valve of the propane tank and the adjustable gas valve were then closed. The safety valve was then disconnected from the valve to the propane tank which caused the safety valve to close immediately in an upstream position, thereby entrapping gas between the safety valve and the adjustable valve. With the safety valve closed in an upstream position, a hole was cut through the rubber nose connecting the safety valve to the manifold using a hand held butane torch. A sharp bang was heard, but no flames were seen. The small amount of gas which was resident in the system between the safety valve and the regulator was instantaneously burned.

The safety valve was then reconnected to the outlet of the valve on the propane tank. The valve on the propane tank was then slowly opened even though there was a hole in the hose connecting the safety valve to the manifold. The safety valve immediately closed any significant escape of gas from the propane tank.

These demonstrations established that unless there was an equalization of pressure throughout the system, or a relatively equal level of pressure throughout the system when gas was being used within the system for heating or cooking, the gas safety valve closed in either an upstream or a downstream position virtually instantaneously upon an imbalance in pressure taking place on either side of the safety valve. In this way, the safety valve immediately closes the supply of gas in either direction, depending upon which side of the safety valve a break or rupture in the system takes place. Only in situations where a regulated amount of gas is being drawn through the system in a downstream direction, does the dash pot in the safety valve remain in an intermediate position, which permits a flow of gas to take place through the safety valve.

The housing and fitting of the safety valve is typically made of high quality brass. The filter, the ball in the buzzer, and the springs, are typically constructed of stainless steel alloy. Various weights of dash pot, and spring tensions, can be used to accommodate various gas flow requirements. The advantage of having a gas safety valve constructed entirely of high quality brass and stainless steel is that no corrosion is possible, and hence the gas fuse has an indefinite life. Moreover, since propane freezes at approximately −40° C., it is important that no component in the safety valve becomes immovable at low temperatures.

As will be apparent to those skilled in the art in the light of the foregoing disclosure, many alterations and modifications are possible in the practice of this invention without departing from the spirit or scope of it. Accordingly, the scope of the invention is to be construed in accordance with the substance defined by the following claims.

I claim:
1. A gas safety valve, comprising:
 (a) a housing including an inlet end and an outlet end and said housing having a longitudinally extending generally cylindrical chamber therein;
 (b) said inlet and adapted for connection to a source of pressurized gas and having an inlet opening communicating with said chamber for permitting gas flow thereto;
 (c) said outlet end adapted for connection to a gas distributor and having an outlet opening communicating with said chamber for permitting gas flow therefrom;
 (d) valve means disposed in said chamber and adapted for longitudinal displacement between said inlet opening and said outlet opening in response to the gas pressure differential between said openings;
 (e) said valve means including first and second annular parallel disks each having top and bottom surfaces;
 (f) a centrally disposed axial shaft positioned between and separating said parallel disks and having a diameter substantially less than the diameter of either of said disks;
 (g) said axial shaft and said disks forming therebetween an annular recess;
 (h) said disks having an outer diameter substantially equal to the diameter of said chamber for providing sliding sealing engagement with the wall of said chamber;
 (i) said first disk including means for sealing said inlet opening and thereby preventing gas flow to said chamber when the pressure differential between said openings is less than a first preselected level so that said valve means is displaced to and seals said inlet opening;
 (j) said second disk including means for sealing said outlet opening and thereby preventing gas flow from said chamber when the pressure differential between said openings exceed a second preselected level and thereby causes said valve means to be displaced to and seal said outlet opening;
 (k) resilient means engaged with said valve means and with said outlet end for biasing said valve means for longitudinal displacement toward said inlet and so that the pressure differential between said opening must exceed the first preselected level to cause said valve means to be displaced out of sealing engagement with said inlet opening and to thereby permit gas flow to said chamber;
 (l) at least a first passageway in said first disk axially extending from said top surface to said bottom surface and opening into said annular recess for permitting gas flow from said inlet opening to said annular recess when said valve means is displaced away from said inlet end;
(m) at least a first passageway in said second disk axially extending from said top surface to said bottom surface and opening into said chamber permitting gas flow from said annular recess into said chamber when said valve means is displaced away from said outlet end; and,
(n) said first disk passageway and said second disk passageway being displaced axially from each other at least 90° to permit a shift of fluid laterally in said annular recess as it passes from the first disk passageway to the second disk passageway.

2. The valve as defined in claim 1, wherein:
(a) said resilient means engaged with said second disk.

3. The valve as defined in claim 1, wherein:
(a) said second disk sealing means including an extension extending from said second disk towards said outlet end and said extension has a diameter less than the diameter of said second disk; and,
(b) said resilient means having a portion thereof circumferentially disposed about said extension and engaged with said second disk.

4. The valve as defined in claim 1, wherein:
(a) buzzer means operatively associated with said inlet opening for indicating gas flow through said inlet opening when the pressure differential between said opening is fluctuating.

5. The valve as defined in claim 4 and wherein said buzzer means including:
(a) a seat;
(b) ball means engageable with said seat and adapted for being displaced from said seat when the pressure at said inlet opening exceeds a preselected level; and,
(c) conical spring means bearing on said ball means for displacing said ball means into engagement with said seat when the gas pressure at said inlet is less than a preselected level.

6. The valve as defined in claim 5, wherein:
(a) said seat disposed in said inlet opening and said ball means being longitudinally displaceable in said inlet opening;
(b) said inlet opening having a shoulder; and,
(c) said conical spring means engaged with said shoulder and with said ball means and being disposed coaxial with said centrally disposed axial shaft.

7. The valve as defined in claim 6, wherein:
(a) a filter disposed in said inlet opening forwardly of said seat.

8. The valve as defined in claim 1, wherein:
(a) a filter disposed in said inlet opening.

9. The valve as defined in claim 1, wherein:
(a) said resilient means comprising a spring.

* * * * *